(12) United States Patent
Yamazaki et al.

(10) Patent No.: US 8,911,541 B2
(45) Date of Patent: Dec. 16, 2014

(54) AQUEOUS FLOOR POLISHING COMPOSITION

(75) Inventors: Yuji Yamazaki, Saitama (JP); Masashi Harada, Saitama (JP)

(73) Assignee: Adeka Corporation, Tokyo (JP)

( * ) Notice: Subject to any disclaimer, the term of this patent is extended or adjusted under 35 U.S.C. 154(b) by 0 days.

(21) Appl. No.: 13/991,214

(22) PCT Filed: Nov. 22, 2011

(86) PCT No.: PCT/JP2011/006492
§ 371 (c)(1),
(2), (4) Date: Jun. 3, 2013

(87) PCT Pub. No.: WO2012/073452
PCT Pub. Date: Jun. 7, 2012

(65) Prior Publication Data
US 2013/0245190 A1   Sep. 19, 2013

(30) Foreign Application Priority Data
Dec. 3, 2010 (JP) ................................ 2010-270203

(51) Int. Cl.
*C09G 1/04* (2006.01)
*C09G 1/00* (2006.01)
*C09G 1/14* (2006.01)

(52) U.S. Cl.
CPC ... *C09G 1/04* (2013.01); *C09G 1/14* (2013.01)
USPC .................. 106/3; 106/8; 106/11; 428/411.1; 524/394; 524/559

(58) Field of Classification Search
CPC .............. C09G 1/04; C09G 1/14; C09G 1/18
USPC ........... 106/3, 8, 11; 428/411.1; 524/394, 559
See application file for complete search history.

(56) References Cited

U.S. PATENT DOCUMENTS

| | | | |
|---|---|---|---|
| 7,378,381 B2 | 5/2008 | Arai et al. | |
| 2006/0236892 A1 | 10/2006 | Arai et al. | |
| 2008/0108743 A1 | 5/2008 | Tomizaki et al. | |
| 2009/0326121 A1* | 12/2009 | Stockl et al. | 524/287 |

FOREIGN PATENT DOCUMENTS

| | | |
|---|---|---|
| JP | 2006-299185 A | 11/2006 |
| JP | 2008-50468 A | 3/2008 |
| JP | 2008-138179 A | 6/2008 |
| JP | 2010-180329 A | 8/2010 |

OTHER PUBLICATIONS

International Search Report for PCT/JP2011/006492 (Dec. 21, 2011).
Patent Abstracts of Japan for JP 2006-299185 A.
Patent Abstracts of Japan for JP 2008-138179 A.
Patent Abstracts of Japan for JP 2010-180329 A.
Supplementary European Search Report dated Apr. 1, 2014 issued in corresponding EP 11844363 application (pp. 1-3).
English Translation Abstract of JP 2008-050468 published Mar. 6, 2008.

* cited by examiner

*Primary Examiner* — Anthony J Green
(74) *Attorney, Agent, or Firm* — Millen, White, Zelano & Branigan, P.C.

(57) ABSTRACT

The present invention is the aqueous floor polishing composition which contains the polyoxyalkylene diester compound represented by the following general formula (1) and does not contain the phosphorus-containing plasticizer. $R^1$ and $R^2$ represent each independently alkyl groups having 1 to 24 carbon atoms, m represents an integer from 2 to 4, n represents a number from 2 to 40.

The aqueous floor polishing composition of the present invention does not contain the phosphorus-containing plasticizer. Therefore, it does not affect the environment negatively, in spite of having excellent leveling properties, lustering properties and heel mark resistance properties.

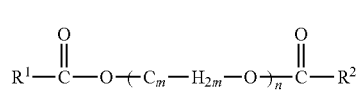

(1)

12 Claims, No Drawings

AQUEOUS FLOOR POLISHING COMPOSITION

TECHNICAL FIELD

The present invention relates to an aqueous floor polishing composition, and further specifically, relates to the aqueous floor polishing composition which has excellent surface smoothing properties (hereafter, also called as leveling properties), lustering properties and abrasion resistance (hereafter, also called as heel mark resistance properties), but does not contain an elemental phosphorus-containing plasticizer and does not negatively affect the environment. In this regard, "aqueous" means a concept comprised of an emulsion type, a dispersion type, a suspension type and a water solution type which use water as a solvent.

BACKGROUND ART

Conventionally, with the purpose of protecting the floor surface and improving the beauty of the same, a floor polishing agent (hereafter, also called as a floor polish) has been applied to the floor surface of buildings so that performances such as luster and heel mark resistance properties can be imparted to the floor surface. The above floor polishing agents fall roughly into the aqueous floor polishing agents or the oily floor polishing agents. Oily floor polishing agents, of which components are mostly petroleum solvents, have problems with flammability and air ventilation both in the working environment and at the time of storage. Therefore, recently aqueous polishing agents have become mainstream as a floor polishing. However, aqueous floor polishing agents had disadvantages in that wetting characteristic is poor due to high surface tension, and also leveling properties are poor due to causing non-uniformity on the dried film. These poor leveling properties due to the non-uniformity of dried film negatively affect durability, beauty of appearance, flexibility and adhesive properties to floor materials or the like. In order to improve these problems, plasticizers and leveling agents have been usually added, and in particular tributoxyethyl phosphate has been mainly used as a plasticizer-cum-leveling agent.

However, there is a fear that the tributoxyethyl phosphate containing elemental phosphorus, leaks in the wastewater or negatively affects the indoor environment. Therefore, an alternative material to tributoxyethyl phosphate is required.

As examples of plasticizers and leveling agents instead of tributoxyethyl phosphate, various compounds such as compositions containing polyalkoxylate of straight chain aliphatic alcohol (Patent document 1), polyethoxylated secondary alcohol (Patent documents 2 and 3), an adipic acid ester compound (Patent document 4), polyoxyethylene alkyl ether and 2,2,4-trimethyl 1,3-pentanediol monoisobutylate (Patent documents 5 and 6), citric acid alkyl ester (Patent document 7), an alkylene oxide addition product of aliphatic alcohol (Patent document 8), benzoate ester (Patent document 9) and ester of hydroxy carboxylic acid with glycol (Patent document 10) have already been reported.

PRIOR ART DOCUMENTS

Patent Documents

Patent document 1: Japanese Examined Patent Publication Tokkohei 06-023355
Patent document 2: Japanese Unexamined Patent Publication Tokkaihei 06-033016
Patent document 3: Japanese Unexamined Patent Publication Tokkai 2007-320982
Patent document 4: Japanese Unexamined Patent Publication Tokkaihei 06-080933
Patent document 5: Japanese Unexamined Patent Publication Tokkai 2003-160763
Patent document 6: Japanese Unexamined Patent Publication Tokkai 2004-107586
Patent document 7: Japanese Unexamined Patent Publication Tokkai 2003-73628
Patent document 8: Japanese Unexamined Patent Publication Tokkai 2005-048026
Patent document 9: Japanese Unexamined Patent Publication Tokkai 2005-255703
Patent document 10: WO 2006/043475

SUMMARY OF THE INVENTION

Problems to be Solved by the Invention

However, the composition containing these tributoxyethyl phosphate alternative materials were not sufficiently satisfied with performances such as luster, leveling properties and heel mark resistance properties.

Therefore, the object of the present invention is to provide an aqueous floor polishing composition wherein an elemental phosphorus-containing plasticizer is not contained, leveling properties, lustering properties and heel mark resistance properties are excellent and also there is no negative effect on the environment.

Means to Solve the Problem

As a result of extensive studies toward attaining the above object, inventors of the present invention have found that when the specified polyoxyalkylene diester compound is blended, the aqueous floor polishing composition can be produced which has excellent leveling properties, lustering properties and heal mark resistance properties and also does not negatively affect the environment since the elemental phosphor is not contained, thereby achieving the present invention.

Namely, the present invention is the aqueous floor polishing composition wherein the elemental phosphor-containing plasticizer is not contained, but the polyoxyalkylenediester compound represented by the following general formula (1) is contained.

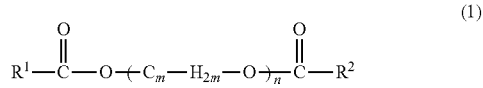

Each of $R^1$ and $R^2$ represents independently an alkyl group having 1 to 24 carbon atoms, m represents an integer from 2 to 4 and n represents a number from 2 to 40.

In the present invention, it is preferable that the above m is 2, and n is from 4 to 20. In addition, it is preferable that the above $R^1$ and $R^2$ are the alkyl groups having 2 to 14 carbon atoms. In particular it is preferable to be a 2-ethylhexyl group.

Furthermore, it is preferable that the aqueous floor polishing composition of the present invention contains 0.5 to 20 mass percent of the above polyoxyalkylene diester compound relative to the total solid content.

Effect of the Invention

The aqueous floor polishing composition of the present invention has effects peculiar to the present invention, that is, there is no negative effect on the environment but the film performances such as leveling properties, lustering properties and heel mark resistance properties are excellent, since the elemental phosphor-containing plasticizer such as tributoxyethyl phosphate is not contained as a plasticizer-cum-leveling agent.

EMBODIMENT FOR CARRYING OUT THE INVENTION

Hereafter, the aqueous floor polishing composition of the present invention will now be described in more detail. The aqueous floor polishing composition of the present invention has the greatest characteristics in that the polyoxyalkylene diester represented by the following general formula (1) is used.

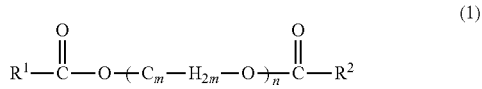
(1)

In the above formula, each of $R^1$ and $R^2$ represents independently an alkyl group having 1 to 24 carbon atoms, m represents an integer from 2 to 4 and n represents a number from 2 to 40.

Examples of the alkyl group having 1 to 24 carbon atoms represented by $R^2$ or $R^2$ in the above general formula (1) are straight chain or branched alkyl groups such as methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, icosanyl, heneicosanyl, docosanyl, tricosanyl and tetracosanyl. In the present invention, the alkyl group having 2 to 14 carbon atoms is preferable among these. In particular, the 2-ethylhexyl group having 8 carbon atoms is preferable due to obtaining easily raw materials as well as obtaining remarkably the effects of the present invention. And also, it is not preferable to use an alkyl group having more than 24 carbon atoms since not only the ease of manufacture is poor, but also the compatibility with other components in an aqueous floor polishing composition is poor.

In the above general formula (1), m in the oxyalkylene unit structure represented as $(C_mH_{2m}O)$ is an integer from 2 to 6. Examples of specific oxyalkylene units are oxyethylene, oxypropylene, oxybutylene, oxypentylene and oxyhexylene. These oxyalkylene units may be straight chain or branched.

In the present invention, among these, from the viewpoints of the compatibility with other components in the aqueous floor polishing composition and the ease of manufacture of raw materials, the oxyethylene unit, oxypropylene unit or oxybutylene unit wherein m is an integer from 2 to 4 is preferable. In particular, the oxyethylene unit wherein m is 2 is preferable.

n is a number from 2 to 40 in the above general formula (1). However, in the present invention it is preferable that n is a number from 4 to 20 in particular. If n is less than 2, the compatibility with other components in the aqueous floor polishing composition tends to be poor. If n is more than 40, the physical properties of the film formed from the aqueous floor polishing composition (adhesive properties and heel mark resistance properties or the like) tend to be poor.

In addition, the polyoxyalkylene part consisting of n oxyalkylene units represented as $(C_mH_{2m}O)$ in the above general formula (1) may be constituted from one kind of oxyalkylene unit alone, or may be constituted from more than two kinds of oxyalkylene units. In cases where the polyoxyalkylene part is constituted from more than 2 kinds of oxyalkylene units, a specific example of combination of oxyalkylene unit is a combination of oxyethylene unit and oxypropylene unit.

Furthermore, when the polyoxyalkylene part is constituted from more than two kinds of oxyalkylene units, the polymerization form thereof is not limited in particular. A random type polyoxyalkylene part wherein plural oxyalkylene units are bonded randomly, a block type wherein each oxyalkylene unit exists in certain blocks separately, or reverse block type polyoxyalkylene part, and further a pluronic type polyoxyalkylene part may be fine.

With regard to the polyoxyalkylene diester compound represented by the general formula (1) used in the present invention, one kind alone may be used, or more than two kinds of it may be combined. Within the range where performances as a plasticizer-cum-leveling agent are not affected, other plasticizer components and other leveling agent components having no phosphorus components can be combined in the arbitrary proportion.

The content of the polyoxyalkylene diester compound represented by the general formula (1) used in the present invention is not limited in particular. However, it is preferable that the proportion of the polyoxyalkylene diester is 0.5 to 20 mass % relative to the total solid content in the aqueous floor polishing composition, 1 to 15 mass % is more preferable and 3 to 10 mass % is the optimum. If the above proportion of the polyoxyalkylene diester is less than 0.5 mass %, the effects of the present invention might not be obtained sufficiently. If it is more than 20 mass %, the heel mark resistance properties or the like might be decreased since the film becomes too soft.

The component of the aqueous floor polishing composition of the present invention is not limited in particular, except that the polyoxyalkylene diester compound represented by the above general formula (1) is an essential component. Commonly-used aqueous floor polishing composition is an aqueous composition having film forming components such as synthetic resin components like acrylic resin and urethane resin and wax components as main components, and it contains surfactants and other various additive agents if necessary.

Examples of the above synthetic resin components are aqueous resins, such as acrylic resin, acrylic-urethane copolymer resin, acrylic-styrene copolymer resin, polyurethane resin, polyester resin, polystyrene resin, polyvinyl acetate resin, polyvinyl chloride resin, polyamide resin, silicon resin, phenol resin, novolac resin, xylene resin and melamine resin. These synthetic resins are commonly used as an aqueous emulsion or an aqueous dispersion.

The molecular weight, the molecular structure and the manufacturing method (polymerization procedure, whether solvent is used or not, or type of solvent) of the above aqueous acrylic resin are not limited and all kinds of aqueous acrylic resin can be used. Examples of these aqueous acrylic resins are the ones commonly used as aqueous floor polishing agents such as "DURAPLUS 2", "DURAPLUS 3", "PRIMALT 2409", "PRIMAL B924" and "RHOPLEX 2133", which are all commercial names, manufactured by Rohm and Hass Japan Co. Ltd., "AE 116(commercial name)" manufactured by JSR Corporation, "ACRYSET FB252E" and "ACRYSET FB 334E", which are both commercial names, manufactured by NIPPON SHOKUBAI CO., LTD.

The molecular weight, the molecular structure and the manufacturing method (polymerization procedure, whether solvent is used or not, or type of solvent) of the above aqueous acrylic-urethane copolymer resin are not limited and all kinds of aqueous acrylic-urethane copolymer resin can be used. For example, "UC 90 (commercial name)" manufactured by Alberdingk Boley, Inc., "ADEKABONTIGHTER-HUX-401 (commercial name)" manufactured by ADEKA CORPORATION and "NeoPac E125(commercial name)" manufactured by DSM Japan K.K. can be cited.

The ionic properties (including anionic, cationic and non-ionic properties), the molecular weight, the molecular structure and the manufacturing method (the method for emulsifying such as self-emulsification or forced emulsification, whether solvent is used or not, or type of solvent), of the aforementioned aqueous urethane resin are not limited and all kinds of aqueous urethane resin can be used. Examples of commercial products are "ADEKABONTIGHTER-HUX-380 (commercial name)" manufactured by ADEKA CORPORATION, "VONDIC 8510(commercial name)" and "HYDRAN HW-171(commercial name)" manufactured by DIC Corporation and "SUPERFLEX 410(commercial name)" manufactured by DAI-ICHI KOGYO SEIYAKU CO., LTD. In the present invention, it is particularly preferable to use the anionic aqueous urethane resin from the viewpoints of the stability of the aqueous floor polishing composition and the physical properties of the film obtained from the composition.

Examples of the aforementioned wax components are synthetic wax, natural wax and modified wax thereof, which are publicly known as waxes for floor polishing agents. Although it is possible to select as appropriate from the above waxes, it is commonly preferable to use a wax emulsion in the present invention.

Examples of synthetic wax are polyethylene wax, oxidized polyethylene wax, polypropylene wax and oxidized polypropylene wax, or carboxyl-modified wax or glycol-modified wax thereof, ethylene-acrylic acid copolymer wax, ethylene-methacrylic acid copolymer wax, Fischer-Tropsch wax, amide wax, oxidized petrolatum, oxidized paraffin and synthetic wax.

Examples of natural wax are petroleum waxes such as paraffin wax and microcrystalline wax; mineral waxes such as montan wax, ceresin wax and ozokerite; plants and animals waxes such as carnauba wax, candelilla wax, rice wax, lanolin, Japan wax, bees wax and sperm oil; and hydrogenated waxes such as cured castor oil and cured castor oil derivative.

As for these film components, one kind of them may be used alone, or more than two kinds of them may be used in combination.

The contents of the above film components are not limited in particular. It is preferable that they are 99 mass % or less relative to the total solid content of the aqueous floor polishing composition. 60 to 99 mass % is more preferable, and 75 to 95 mass % is the optimum. If the above content of the film component is more than 99 mass %, the effects of the present invention such as leveling properties may not be sufficient.

In addition, it is preferable in the present invention that both of the aforementioned synthetic resin components and wax components are contained as the above film components. In this case, it is preferable that the content of synthetic resin component is 60 to 99 mass % relative to the total solid content of the aqueous floor polishing composition. 70 to 90 mass % is more preferable. It is preferable that the content of wax component is 0.1 to 20 mass %. 0.5 to 15 mass % is more preferable.

Kinds of the aforementioned surfactants are not limited in particular. Any of anionic surfactants, non-ionic surfactants, cationic surfactant and ampholytic surfactants may be fine. One kind of them may be used alone. More than two kinds of them may be used in combination.

Examples of the above anionic surfactant are alkyl sulfates such as sodium dodecylsulfate, potassium dodecylsulfate, ammonium dodecylsulfate; polyoxyethylene ether sulfates such as sodium dodecylpolyglycolethersulfate, ammonium polyoxyethylene alkylethersulfate; sodium sulphorichinolates; alkyl sulfonates such as alkali metal salt of sulfonated paraffin, ammonium salt of sulfonated paraffin; fatty acid salts such as sodium laurate, triethanolamine oleate, triethanolamine abietate; alkylarylsulfonates such as sodium benzenesulfonate, alkali metal sulfate of alkali phenolhydroxyethylene; high alkylnaphthalenesulfonic acid salt; naphthalenesulfonic acid formalin condensation product; dialkylsulfosuccinic acid salt; polyoxyethylenealkylsulfate salt; polyoxyethylenealkylarylsulfate salt; polyoxyethylene ether phosphate salt; polyoxyethylenealkylether acetate; N-acylamino acid salt; and N-acylmethyl taurinate.

Examples of the aforementioned nonionic surfactant are fatty acid partial esters of polyalcohol such as sorbitan monolaurate and sorbitan monooleate; polyoxyethyleneglycol fatty acid esters; polyglycerine fatty acid esters; ethylene oxide and/or propylene oxide addition product of alcohol having 1 to 18 carbon atoms; ethylene oxide and/or propylene oxide addition product of alkylphenol; ethylene oxide and/or propylene oxide addition product of alkyleneglycol and/or alkylenediamine.

Examples of alcohol having 1 to 18 carbon atoms, which constitutes the above nonionic surfactants are methanol, ethanol, propanol, 2-propanol, butanol, 2-butanol, tertiary butanol, amyl alcohol, isoamylalcohol, tertiary amylalcohol, hexanol, octanol, decane alcohol, lauryl alcohol, myristyl alcohol, palmityl alcohol and stearyl alcohol.

Examples of the aforementioned alkylphenol are phenol, methylphenol, 2,4-di-tert-butylphenol, 2,5-di-tert-butylphenol, 3,5-di-tert-butylphenol, 4-(1,3-tetramethylbutyl)phenol, 4-isooctylphenol, 4-nonylphenol, 4-tert-octylphenol, 4-dodecylphenol, 2-(3,5-dimethylheptyl)phenol, 4-(3,5-dimethylheptyl)phenol, naphtol, bisphenol A and bisphenol F.

Examples of the aforementioned alkyleneglycol are ethylene glycol, 1,2-propanediol, 1,3-propanediol, 2-methyl-1,3-propanediol, 2-butyl-2-ethyl-1,3-propanediol, 1,4-butanediol, neopentylglycol, 1,5-pentanediol, 3-methyl-1,5-pentanediol, 2,4-diethyl-1,5-pentanediol, and 1,6-hexanediol. Examples of alkylenediamine are compounds obtained by replacing alcoholic hydroxyl groups of these alkyleneglycols with amino groups. The addition product of ethyleneoxide or propyleneoxide may be a random addition product or a block addition product.

Examples of the aforementioned cationic surfactants are lauryl trimethyl ammonium chloride, stearyl trimethyl ammonium chloride, distearyl dimethyl ammonium chloride, didecyl dimethyl ammonium chloride, lauryl benzyl dimethyl ammonium chloride, alkyl pyridinium bromide and imidazolinium laurate.

Examples of the aforementioned ampholytic surfactants are betaine types such as coconut oil fatty acid amide propyl dimethyl acetic acid betaine, lauryl dimethyl aminoacetic acid betaine, stearyl dimethyl aminoacetic acid betaine, dodecyl aminomethyl dimethyl sulfopropyl betaine, octadecyl aminomethyl dimethyl sulfopropyl betaine, 2-alkyl-N-carboxyl methyl-N-hydroxymethyl imidazolinium betaine, lauryl hydroxy sulfobetaine, lauroyl amide ethyl hydroxy ethyl carboxymethyl betaine, hydroxy propyl phosphoric acid metal salt; amino acid types such as lauroyl glutamic acid- or β-lauryl amino propionic acid metal salt; and amine oxide types such as lauroyl methyl-β-alanine, lauryl dimethyl amine N-oxide and oleyldimethyl amine N-oxide.

The contents of the aforementioned surfactants are not limited in particular. It is preferable that they are 1 to 20 mass % relative to the total solid content of the aqueous floor polishing composition. 5 to 10 mass % is more preferable. If the content is less than 1 mass %, the film component may be not dispersed sufficiently. When the content of the surfactants is more than 20 mass %, the physical properties of the film obtained may be negatively affected, for instance, the heel mark resistance properties may be decreased.

Examples of the aforementioned various additive agents are a film making auxiliary agent, a wetting characteristic auxiliary agent, an antioxidant (a phosphorus, phenol or sulfuric antioxidant agent), an ultraviolet absorber, a light stabilizer, a fluorescent whitening agent, a penetrating agent, a perfume material, a deforming agent, a disinfecting agent, a thickening agent, a colorant, a pigment, a wetting agent, an antifreezing agent and a multivalent metallic compound, and also, a henzoisothiazoline antiseptic agent and a triazine antiseptic agent, peel property improving agents such as alkali-soluble resin and fluorine compound, a pH conditioning agent such as ammonium, antistatic agents such as coloidal silica or alumina sol.

Examples of the above film making auxiliary agent are alcohols such as ethanol, isopropyl alcohol and 3-methyl-3-methoxy butanol; polyalcohols such as ethylene glycol; glycol ethers such as diethylene glycol monomethylether, diethylene glycol monoethylether, dipropylene glycol monomethylether, dipropylene glycol monoethyl ether, ethylene glycolmono-2-methylhexylether and diethylene glycolmono-2-ethylhexylether; and amine compounds such as α-aminoalcohol, β-aminoalcohol, diethanol amine, triethanol amine, 2-amino isohexyl alcohol, N,N-diethyl ethanol amine, N,N-dimethyl ethanol amine, aminoethyl ethanol amine, N-methyl-N,N-diethanol amine, N,N-butyl ethanol amine, N-methyl ethanol amine and 3-amino-1-propanol. As for these filmmaking auxiliary agents, one kind of them may be used alone, or, more than two kinds of them may be used in combination. The content of film making auxiliary agent is not limited in particular. It is preferable that it is 5 to 50 mass parts relative to 100 mass parts of the total solid content of aqueous floor polishing composition. 10 to 30 mass parts is more preferable.

Examples of the aforementioned wetting characteristic auxiliary agent are silicone compounds such as silicone oil, silicone resin emulsion, amino-modified silicone, polyether-modified silicone, silicone rubber emulsion, ethylenic unsaturated monomer modified silicone, poly(ethylenic unsaturated monomer) modified silicone and a silicone surfactants; fatty acid esters such as sucrose fatty acid ester, sorbitan fatty acid ester, polyethylene glycol fatty acid ester and polyglyceryl fatty acid ester; fatty acid alkanolamides such as coconut oil fatty acid diethanolamide, lauric acid diethanolamide, lauric acid myristic acid diethanol amide, myristic acid diethanol amide, oleic acid diethanol amide and palm kernel oil fatty acid diethanol amide; and also sulfosuccinic acid ester salt, a fluorine containing surfactants, an anion surfactants, a non-ionic surfactants, an ampholytic surfactants, polyoxyethylene alkyl ether, polyoxyethylene polyoxypropylene alkyl ether and polyoxyethylene polyoxypropylene copolymers. It is preferable that the amount of the wetting characteristic auxiliary agents used is 0.01 to 10 mass % relative to the total solid content of the aqueous floor polishing composition.

Examples of the aforementioned phosphorus antioxidant are triphenylphosphite, tris(2,4-di-tert-butylphenyl)phosphite, tris(2,5-di-tert-butylphenyl)phosphite, tris(nonylphenyl)phosphite, tris(dinonylphenyl)phosphite, tris(mono- and di-mixed nonylphenyl)phosphite, diphenyl acid phosphite, 2,2'-methylenebis(4,6-di-tert-butylphenyl)octylphosphite, diphenyldecylphosphite, diphenyloctylphosphite, di(nonylphenyl)pentaerythritol diphosphite, phenyldiisodecylphosphite, tributylphosphite, tris(2-ethylhexyl)phosphite, tridecylphosphite, trilaurylphosphite, dibutyl acid phosphite, dilauryl acid phosphite, trilauryltrithiophosphite, bis(neopentylglycol).1,4-cyclohexane dimethyldiphosphite, bis(2,4-di-tert-butylphenyl)pentaerythritol diphosphite, bis(2,5-di-tert-butylphenyl)pentaerythritol diphosphite, bis(2,6-di-tert-butyl-4-methylphenyl)pentaerythritol diphosphite, bis(2,4-dicumylphenyl)pentaerythritol diphosphite, distearylpentaerythritol diphosphite, tetra($C_{12-15}$ mixed alkyl)-4,4'-isopropylidenediphenylphosphite, bis[2,2'-methylenebis(4,6-diamylphenyl)].isopropylidenediphenylphosphite, tetratridecyl.4,4'-butylidenebis(2-tert-butyl-5-methylphenol)diphosphite, hexa(tridecyl).1,1,3-tris(2-methyl-5-tert-butyl-4-hydroxyphenyl)butane.triphosphite, tetrakis(2,4-di-tert-butylphenyl)biphenylenediphosphonite, tris(2-[(2,4,7,9-tetrakis-tert-butyldibenzo[d,f][1,3,2]dioxaphosphepin-6-yl)oxy]ethyl)amine, 9,10-dihydro-9-oxa-10-phosphaphenanthrene-10-oxide, tris(2-[(2,4,8,10-tetrakis-tert-butyldibenzo[d,f][1,3,2]dioxaphosphepin-6-yl)oxy]ethyl)amine, 2-(1,1-dimethylethyl)-6-methyl-4-[3-[[2,4,8,10-tetrakis(1,1-dimethylethyl)dibenzo[d,f][1,3,2]dioxaphosphepin-6-yl]oxy]propyl]phenol and 2-butyl-2-ethylpropanediol.2,4,6-tri-tert-butylphenol monophosphite.

Examples of the aforementioned phenol antioxidants are 2,6-di-tert-butyl-p-cresol, 2,6-diphenyl-4-octadecyloxyphenol, stearyl(3,5-di-tert-butyl-4-hydroxyphenyl)propionate, distearyl(3,5-di-tert-butyl-4-hydroxybenzyl)phosphonate, tridecyl.3,5-di-tert-butyl-4-hydroxybenzyl thioacetate, thiodiethylenebis[(3,5-di-tert-butyl-4-hydoxyphenyl)propionate], 4,4'-thiobis(6-tert-butyl-m-cresol), 2-octylthio-4,6-di(3,5-di-tert-butyl-4-hydroxyphenoxy)-s-triazine, 2,2'-methylenebis(4-methyl-6-tert-butylphenol), bis[3,3-bis(4-hydroxy-3-tert-butylphenyl)butyric acid]glycol ester, 4,4'-butylidenebis(2,6-di-tert-butylphenol), 4,4'-butylidenebis(6-tert-butyl-3-methylphenol), 2,2'-ethylidenebis(4,6-di-tert-butylphenol), 1,1,3-tris(2-methyl-4-hydroxy-5-tert-butylphenyl)butane, bis[2-tert-butyl-4-methyl-6-(2-hydroxy-3-tert-butyl-5-methylbenzyl)phenyl]terephthalate, 1,3,5-tris(2,6-dimethyl-3-hydroxy-4-tert-butylbenzyl)isocyanurate, 1,3,5-tris(3,5-di-tert-butyl-4-hydroxybenzyl)isocyanurate, 1,3,5-tris(3,5-di-tert-butyl-4-hydroxybenzyl)-2,4,6-trimethylbenzene, 1,3,5-tris[(3,5-di-tert-butyl-4-hydroxyphenyl)propionyloxyethyl]isocyanurate, tetrakis[methylene-3-(3',5'-di-tert-butyl-4'-hydroxyphenyl) propionate]methane, 2-tert-butyl-4-methyl-6-(2-acryloyloxy-3-tert-butyl-5-methylbenzyl)phenol, 3,9-bis[2-(3-tert-butyl-4-hydroxy-5-methylhydrocinnamoyloxy)-1,1-dimethylethyl]-2,4,8,10-tetraoxaspiro[5,5]undecane, triethyleneglycolbis[β-(3-tert-butyl-4-hydroxy-5-methylphenyl)propionate], and tocophenol.

Examples of the aforementioned sulfuric antioxidants are dialkylthiodipropionates such as esters of thiodipropionic acid with dilauryl, dimyristyl, myristylstearyl or distearyl; and β-alkylmercapto propionic acid esters of polyol such as pentaerythritol tetra(R-dodecylmercaptopropionate).

Examples of the aforementioned ultraviolet absorber are 2-hydroxybenzophenones such as 2,4-dihydroxybenzophenone, 2-hydroxy-4-methoxybenzophenone, 2-hydroxy-4-octoxybenzophenone, 5,5'-methylenebis(2-hydroxy-4-methoxybenzophenone); 2-(2-hydroxyphenyl)benzotriazoles such as 2-(2-hydroxy-5-methylphenyl)benzotriazole, 2-(2-hydroxy-5-tert-octylphenyl)benzotriazole, 2-(2-hydroxy-3,5-di-tert-butylphenyl)-5-chlorobenzotriazole, 2-(2-hydroxy- 3-tert-butyl-5-methylphenyl)-5-chlorobenzotriazole, 2-(2-hydroxy-3,5-dicumylphenyl)benzotriazole, 2,2'-methylenebis(4-tert-octyl-6-benzotriazolylphenol), polyethylene glycolester of 2-(2-hydroxy-3-tert-butyl-5-carboxyphenyl)benzotriazole, 2-[2-hydroxy-3-(2-acryloyloxyethyl)-5-methylphenyl]benzotriazole, 2-[2-hydroxy-3-(2-methacryloyloxyethyl)-5-tert-butylphenyl]benzotriazole, 2-[2-hydroxy-3-(2-methacryloyloxyethyl)-5-tert-octylphenyl]benzotriazole, 2-[2-hydroxy-3-(2-methacryloyloxyethyl)-5-tert-butylphenyl]-5-chlorobenzo triazole, 2-[2-hydroxy-5-(2-methacryloyloxyethyl)phenyl]benzotriazole, 2-[2-hydroxy-3-tert-butyl-5-(2-methacryloyloxyethyl)phenyl]benzotriazole, 2-[2-hydroxy-3-tert-amyl-5-(2-methacryloyloxyethyl)phenyl]benzotriazole, 2-[2-hydroxy-3-tert-butyl-5-(3-methacryloyloxypropyl)phenyl]-5-chlorobenzotriazole, 2-[2-hydroxy-4-(2-methacryloyloxymethyl)phenyl]benzotriazole, 2-[2-hydroxy-4-(3-methacryloyloxy-2-hydroxypropyl)phenyl]benzotriazole and 2-[2-hydroxy-4-(3-methacryloyloxypropyl)phenyl]benzotriazole; 2-(2-hydroxyphenyl)-4,6-diaryl-1,3,5-triazines such as 2-(2-hydroxy-4-methoxyphenyl)-4,6-diphenyl-1,3,5-triazine, 2-(2-hydroxy-4-hexyloxyphenyl)-4,6-diphenyl-1,3,5-triazine, 2-(2-hydroxy-4-octoxyphenyl)-4,6-bis(2,4-dimethylphenyl)-1,3,5-triazine, 2-[2-hydroxy-4-(3-$C_{12}$-$C_{13}$ mixed alkoxy-2-hydroxypropoxy)phenyl]-4,6-bis(2,4-dimethylphenyl)-1,3,5-triazine, 2-[2-hydroxy-4-(2-acryloyloxyetoxy)phenyl]-4,6-bis(4-methylphenyl)-1,3,5-triazine, 2-(2,4-dihydroxy-3-allylphenyl)-4,6-bis(2,4-dimethylphenyl)-1,3,5-triazine and 2,4,6-tris(2-hydroxy-3-methyl-4-hexyloxyphenyl)-1,3,5-triazine; benzoates such as phenyl salicylate, resorcinol monobenzoate, 2,4-di-tert-butylphenyl-3,5-di-tert-butyl-4-hydroxybenzoate, octyl(3,5-di-tert-butyl-4-hydroxy)benzoate, dodecyl(3,5-di-tert-butyl-4-hydroxy)benzoate, tetradecyl(3,5-di-tert-butyl-4-hydroxy)benzoate, hexadecyl(3,5-di-tert-butyl-4-hydroxy)benzoate, octadecyl (3,5-di-tert-butyl-4-hydroxy)benzoate and behenyl(3,5-di-tert-butyl-4-hydroxy)benzoate; substituted oxanilides such as 2-ethyl-2'-etoxyoxanilide and 2-etoxy-4'-dodecyloxanilide; cyanoacrylates such as ethyl-α-cyano-β,β-diphenylacrylate and methyl-2-cyano-3-methyl-3-(p-methoxyphenyl) acrylate; and various kinds of metal salts or metal chelates, in particular nickel or chromium salts or chelates.

Examples of the aforementioned light-stabilizer are hindered amine light stabilizers such as 2,2,6,6-tetramethyl-4-piperidylstearate, 1,2,2,6,6-pentamethyl-4-piperidylstearate, 2,2,6,6-tetramethyl-4-piperidylbenzoate, bis(2,2,6,6-tetramethyl-4-piperidyl)sebacate, bis(1,2,2,6,6-pentamethyl-4-piperidyl)sebacate, bis(1-octoxy-2,2,6,6-tetramethyl-4-piperidyl)sebacate, 1,2,2,6,6-pentamethyl-4-piperidylmethylmethacrylate, 2,2,6,6-tetramethyl-4-piperidylmethylmethacrylate, tetrakis(2,2,6,6-tetramethyl-4-piperidyl)-1,2,3,4-butanetetracarboxylate, tetrakis(1,2,2,6,6-pentamethyl-4-piperidyl)-1,2,3,4-butanetetracarboxylate, bis(2,2,6,6-tetramethyl-4-piperidyl).bis(tridecyl)-1,2,3,4-butanetetracarboxylate, bis(1,2,2,6,6-pentamethyl-4-piperidyl).bis(tridecyl)-1,2,3,4-butanetetracarboxylate, bis(1,2,2,6,6-pentamethyl-4-piperidyl)-2-butyl-2-(3,5-di-tert-butyl-4-hydroxybenzyl)malonate, 1-(2-hydroxyethyl)-2,2,6,6-tetramethyl-4-piperidynol/diethyl succinate condensation polymerization products, 1,6-bis(2,2,6,6-tetramethyl-4-piperidylamino)hexane/dibromo ethane condensation polymerization products, 1,6-bis(2,2,6,6-tetramethyl-4-piperidylamino)hexane/2,4-dichloro-6-morpholino-s-triazine condensation polymerization products, 1,6-bis(2,2,6,6-tetramethyl-4-piperidylamino)hexane/2,4-dichloro-6-tert-octylamino-s-triazine condensation polymerization products, 1,5,8,12-tetrakis[2,4-bis(N-butyl-N-(2,2,6,6-tetramethyl-4-piperidyl)amino)-s-triazine-6-yl]-1,5,8,12-tetra-azadodecane, 1,5,8,12-tetrakis[2,4-bis(N-butyl-N-(1,2,2,6,6-pentamethyl-4-piperidyl)amino)-s-triazine-6-yl]-1,5,8,12-tetra-azadodecane, 1,6,11-tris[2,4-bis(N-butyl-N-(2,2,6,6-tetramethyl-4-piperidyl)amino)-s-triazine-6-ylamino] undecane, 1,6,11-tris[2,4-bis(N-butyl-N-(1,2,2,6,6-pentamethyl-4-piperidyl)amino)-s-triazine-6-ylamino] undecane, 3,9-bis[1,1-dimethyl-2-[tris(2,2,6,6-tetramethyl-4-piperidyloxycarbonyloxy)butylcarbonyloxy]ethyl]-2,4,8,10-tetraoxaspiro[5.5]undecane, 3,9-bis[1,1-dimethyl-2-[tris (1,2,2,6,6-pentamethyl-4-piperidyloxycarbonyloxy) butylcarbonyloxy]ethyl]-2,4,8,10-tetraoxaspiro[5.5] undecane.

As for each amount of the aforementioned antioxidant, light stabilizer and ultraviolet absorber used, it is preferable to use 0.001 to 10 mass parts relative to 100 mass parts of the total solid content of aqueous floor polishing composition. 0.01 to 5 mass parts is more preferable. If it is less than 0.001 mass parts, sufficient effects of addition may not be obtained. If it is more than 10 mass parts, physical properties of the film may be negatively affected. In addition, as for the method for adding the light stabilizer, ultraviolet absorber and antioxidant, it is preferable to disperse them in the aqueous floor polishing composition by using the aforementioned surfactants, or to add them as an emulsion (or a suspension) which was prepared by dispersing them in water beforehand.

In the present invention, as a plasticizer, at least one kind of polyoxy alkylene diester compounds represented by the general formula (1) may be used with other conventional plasticizers in combination.

Examples of the above conventional plasticizers are citric acid ester such as acetyl citric acid tributyl; ricinoleic acid ester such as methyl acetyl ricinoleate; lactic acid ester, tartaric acid ester, fumaric acid ester and maleic acid ester; and also phosphate esters such as tributoxyethyl phosphate, tributyl phosphate and triphenyl phosphate; phthalic acid esters such as dibutyl phthalate, dihexyl phthalate, di-2-ethylhexyl phthalate, di-n-octyl phthalate, diisooctyl phthalate, didecyl phthalate, dinonyl phthalate, diisononyl phthalate, diisodecyl phthalate, butyl benzyl phthalate and octyl benzyl phthalate; adipic acid esters such as di-2-ethylhexyl adipic acid ester, dimethyl adipic acid ester and dibutyl adipic acid ester; aliphatic dibasic acid esters such as dibutyl sebacic acid ester and di-2-ethyl hexyl sebacic acid ester; sulfonamide such as N-butyl benzene sulfonamide; fatty acid amide; epoxy fatty acid ester and isobutyl ester derivative of pentadiol; and chlorinated paraffin. In the present invention, at least one kind selected from these can be used, or more than two kinds selected from these can be used in combination. Furthermore, from the viewpoint of further considering the environment safety, it is preferable to use other plasticizers than phosphate ester as the conventional plasticizer to be combined.

In addition, in order to improve the performances such as usability and stability, solvents such as ethyl carbitol, acetyl ethyl carbitol, butyl carbitol, acetyl butyl carbitol, texanol, dimethyl carbitol, methyl ethyl carbitol, diethyl carbitol and ethanol can be used for the aqueous floor polishing composition of the present invention.

This invention will now be described in more detail by reference to the following examples. However, the invention should not be construed as being limited to these examples.

Examples from 1 to 6 and Comparative Examples from 1 to 7

25.0 g of aqueous acrylic resin (Commercial name; PRIMALT B 924, manufactured by Rohm and Haas Company, solid content is 38%), 16.0 g of aqueous urethane resin (Commercial name; ADEKABONTIGHTER-HUX-381, manufactured by ADEKA CORPORATION, solid content is 38%), 6.0 g of oxidized polyethylene wax emulsion (Commercial name; HYTEC E 4000, manufactured by TOHO Chemical Industry Co., Ltd., solid content is 40%), 5.0 g of filmmaking auxiliary agent (diethyleneglycol monomethyl ether), 0.03 g of deforming agent (Commercial name: ADEKA NATE B 1016, manufactured by ADEKA CORPORATION) and the plasticizers having types and the amounts described in the following Table 1 or 2 were blended and the aqueous polishing agent composition was prepared by controlling the fluid to make 25 mass % of the total solid content. According to the JIS K 3920 (the floor polish test method), the leveling properties, the lustering properties and the heel mark resistance properties of the obtained preparation fluid were evaluated. The evaluation results were shown in both Table 1 and 2.

[Leveling Properties]

According to the JIS K 3920 (the floor polish test method), the above prepared aqueous floor polishing composition was uniformly applied to the homogeneous vinyl floor tile and was spread on it (Commercial name: MS PLAIN 5608, manufactured by TOLI CORPORATION). As soon as the application and continued spreading were finished, the letter "X" was diagonally drawn on the coated surface of the base material, by using a previously-used coating tool. After the film dried, how much the letter "X" disappeared was observed visually and evaluated the leveling properties according to the following evaluation standards.

<Evaluation Standards>

5: The "X" loses shape and can not be recognized as a letter

4: Only the silhouette of "X" can be slightly recognized with the luster changes. However, the swell of film cannot be recognized.

3: "X" can be slightly recognized as a letter. However, the swell of film can be scarcely recognized.

2: The letter "X" can be clearly recognized and the swell of film can be recognized as well.

1: The letter "X" can be clearly recognized and also the swell of film can be clearly recognized.

[Degree of Luster]

According to the JIS K 3920 (the floor polish test method), each composition was applied three times on the composition vinyl floor tile (Commercial name: "MV33", manufactured by TOLI CORPORATION), and the degree of luster was measured.

[Heel Mark Resistance Properties]

According to the JIS K 3920 (the floor polish test method), the heel mark resistance properties was measured wherein the homegeneous vinyl floor tile (Commercial name: "MS PLAIN5601", manufactured by TOLI CORPORATION) was used as a base material of floor. In this regard, the evaluation standards are as follows.

◎: Hardly any heel marks attach
○: Slight heel marks attach
Δ: Some heel marks attach
×: Lots of heel marks attach

TABLE 1

|  |  | Examples | | | | | |
|---|---|---|---|---|---|---|---|
|  |  | 1 | 2 | 3 | 4 | 5 | 6 |
| Plasticizer | Type | A*1 | A | A | B*2 | C*3 | D*4 |
|  | Blending amount (g) | 1.0 | 2.0 | 3.0 | 2.0 | 2.0 | 2.0 |
| Evaluation | Leveling properties | 4 | 5 | 5 | 5 | 5 | 5 |
|  | Degree of luster (%) | 58 | 56 | 55 | 53 | 51 | 52 |
|  | Heel mark resistance properties | ◎ | ◎ | ○ | ○ | ○ | ○ |

*1 Plasticizer A: $R^1$ and $R^2$ are 2-ethyl hexyl groups, m = 2 and n = 6 in the general formula (1)
*2 Plasticizer B: $R^1$ and $R^2$ are 2-ethyl hexyl groups, m = 2 and n = 13 in the general formula (1).
*3 Plasticizer C: $R^1$ and $R^2$ are 2-ethyl hexyl groups, m = 2 and n = 20 in the general formula (1)
*4 Plasticizer D: $R^1$ and $R^2$ are lauryl groups, m = 2 and n = 6 in the general formula (1)

(1)

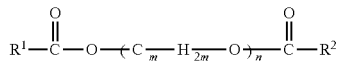

TABLE 2

|  |  | Comparative examples | | | | | | |
|---|---|---|---|---|---|---|---|---|
|  |  | 1 | 2 | 3 | 4 | 5 | 6 | 7 |
| Plasticizer | Type | TBEP*1 | TBEP | TBEP | DOA*2 | E*3 | F*4 | E |
|  | Blending amount (g) | 1.0 | 3.0 | 5.0 | 2.0 | 2.0 | 2.0 | 2.5 |
| Evaluation | Leveling properties | 4 | 5 | 5 | 3 | 3 | 3 | 5 |
|  | Degree of luster (%) | 59 | 54 | 45 | 53 | 47 | 50 | 32 |
|  | Heel mark resistance properties | ◎ | ○ | Δ | Δ | Δ | Δ | × |

*1 TBEP: tribtoxyethyl phosphate
*2 DOA: dioctyl adipate
*3 Plasticizer E: $R^1$ and $R^2$ are 2-ethylhexyl groups, m = 2 and n = 45 in the general formula (1).
*4 Plasticizer F: $R^1$ and $R^2$ are benzoate groups, m = 2 and n = 13 in the general formula (1).

As is clear from the results of Examples and Comparative examples from 4 to 7, it was confirmed that the polyoxyalkylene diester compound of the present invention which has a specific structure, is excellent in the leveling properties, the degree of luster and the heel mark resistance properties. In addition, from the results of Examples and Comparative examples from 1 to 3 (tributoxy phosphate), it was confirmed that the polyoxyalkylene diester compound used in the present invention goes toe-to-toe with the conventional plasticizer-cum-leveling agent in its effect.

INDUSTRIAL APPLICABILITY

The aqueous floor polishing composition which uses the specific polyoxy alkylenediester compound represented by the general formula (1) as a plasticizer-cum-leveling agent, is environmentally friendly and has performances equivalent to or greater than conventional products, which use tributoxy ethyl phosphate as a plasticizer-cum-leveling agent, even though it does not contain any phosphorus containing plasticizer, therefore, the present invention is extremely useful in industries.

The invention claimed is:

1. An aqueous floor polishing composition comprising a film forming component and a polyoxyalkylenediester compound of formula (1), which does not contain phosphorus containing plasticizer;

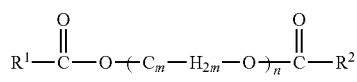
(1)

wherein both of $R^1$ and $R^2$ represent 2-ethylhexyl, m represents an integer from 2 to 4 and n represents a number from 2 to 40.

2. The aqueous floor polishing composition described in claim 1, wherein m is 2 in formula (1).

3. The aqueous floor polishing composition described in claim 1, wherein n is a number from 4 to 20 in formula (1).

4. The aqueous floor polishing composition described in claim 1, which has a synthetic resin component which is in an amount from 60 to 99 mass % relative to the total solid content of the aqueous floor polishing composition and which has a wax component which is in an amount from 0.1 to 20 mass % relative to the total solid content of the aqueous floor polishing composition.

5. The aqueous floor polishing composition described in claim 4, wherein the synthetic resin component is an anionic aqueous polyurethane resin.

6. The aqueous floor polishing composition described in claim 1 wherein the content of the above polyoxyalkylene diester compound is from 0.5 to 20 mass % relative to the total solid content.

7. The aqueous floor polishing composition described in claim 1, which does not contain pigments.

8. The aqueous floor polishing composition described in claim 4, which does not contain pigments.

9. A floor surface comprising a coating of the aqueous floor polishing composition described in claim 1.

10. A vinyl floor tile comprising a coating of the aqueous floor polishing composition described in claim 1.

11. A method for polishing a floor, comprising polishing said floor with the aqueous floor polishing composition described in claim 1.

12. A method according to claim 11, wherein the floor is made of vinyl floor tile.

* * * * *